Nov. 17, 1970     H. PAPE     3,540,865
SYSTEM FOR ABSORBING AND BURNING COMBUSTIBLE LIQUIDS
Filed Feb. 20, 1968
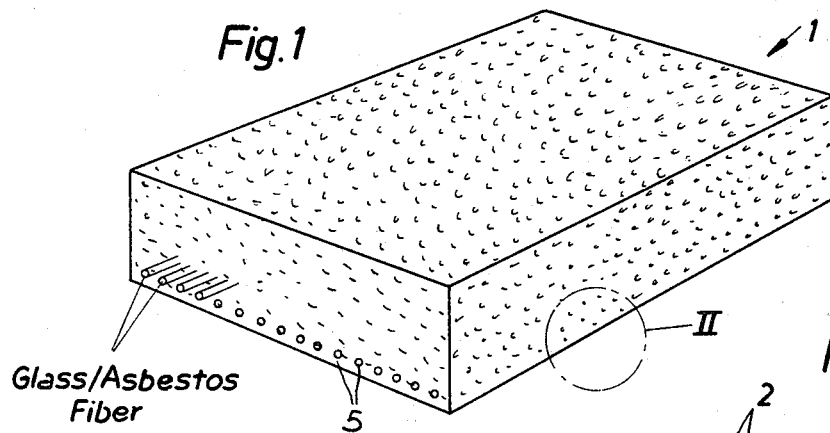
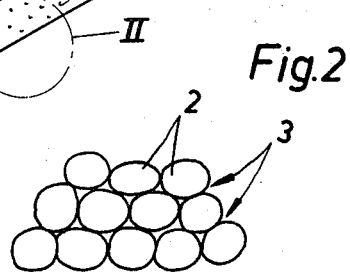
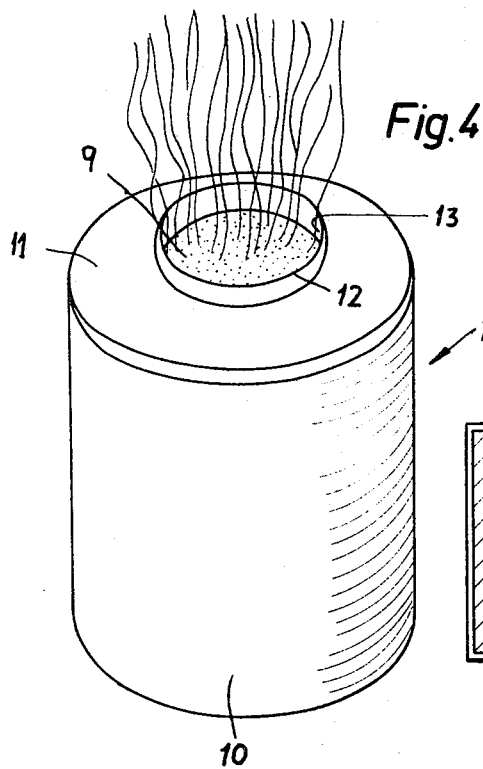
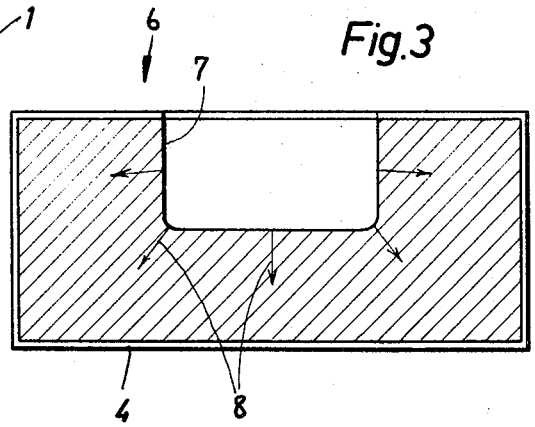
Hans Pape
*Inventor.*
By Karl G. Ross
Attorney

3,540,865
SYSTEM FOR ABSORBING AND BURNING COMBUSTIBLE LIQUIDS
Hans Pape, Dortmund-Hochsten, Germany, assignor to Firma Ekoperl GmbH, Dortmund, Germany, a corporation of Germany
Filed Feb. 20, 1968, Ser. No. 706,951
Claims priority, application Germany, Feb. 22, 1967, E 24,753
Int. Cl. C10l *11/00*
U.S. Cl. 44—38      2 Claims

ABSTRACT OF THE DISCLOSURE

A system for the absorption and combustion of combustible liquids in which a porous absorptive body is formed by bonding perlite or vermiculite particles together with an inorganic heat-resistant binder, preferably with a mineral fiber reinforcement, the combustible liquid is absorbed into the body thus formed and the fluid is ignited in the body to combust the organic liquid. The body may have a metallic shell forming a burner at the opening of which the ignition takes place and may be treated with a hydrophobic material adapted to repel water and promote the absorptivity of the body with respect to oils.

---

My present invention relates to a device for the absorption and destruction of combustible liquids especially oils and petroleum fractions.

The removal of quantities of combustible fuels has become a problem in many industrial processes and in other fields in which oils and the like tend to accumulate. For example, in oil refineries, installations for the purification and fractionation of used oils or for the recovery of oils from other materials, in chemical plants or the like in which oily residues tend to accumulate, in packaging and processing plants in which combustible liquids (if normally classified as oils) including benzene, turpentine, acetone and other solvents, gasoline and less volatile organic liquids, in tank farms or the like for the storage of petroleum products, in ports for the emptying and filling of tank ships or in stations for the filling of tank cars and trucks, the presence of pools of oil and other organic combustible liquids has always been a problem. In fact, leakage from storage tanks and piping systems may be encountered even in retail establishments or distributing stations for the organic liquids and the problem may develop without warning from damage to an oil or organic-liquid carrier or vehicle. Frequently, sumps are provided in the region of oil and solvent tanks for the accumulation of the inflammable liquid and it is not uncommon for special troughs to be provided for channeling leakage and overflow of such liquid along predetermined paths. Practically the only method which has been found to be suitable heretofore for the disposal of these low-volatility inflammable liquids is their absorption onto and into materials such as sawdust, peat and wood meal and to dispose of the sludge thus resulted by combustion in special ovens or to recover the liquid by retort treatment. The special furnaces and disposal systems for destroying the sludge have rendered prior-art systems inapplicable to household use in which oil leakage from oil-heating systems is frequently a problem. Thus, on the one hand, prior-art systems have not proved to be sufficiently universal in their applicability and, on the other hand, these earlier devices and processes are highly expensive.

It is, therefore, the principal object of the present invention to provide an improved device for the combustion of absorbed combustible organic liquids which is relatively inexpensive but operates efficiently.

Another object of this invention is to provide an improved method of eliminating pools of oil and other inflammable liquids.

Another object of my invention is to provide an improved method of and means for kindling fuels.

These objects and others, which will become apparent hereinafter, are attainable with a system based in part upon my early development disclosed in copending application Ser. No. 489,764, filed Sept. 23, 1965 (now U.S. Pat. No. 3,382,170). In that application, I describe a method of removing an oil film from a body of water whereby mineral perlite (expanded or blown) is coated with a silicone to form an oleospecific adsorbent capable of preferentially taking up oil from the water is cast upon the oil film. The expanded perlite is found to absorb substantially no water and a significant quantity of oil.

I have now discovered that certain of these principles can be used effectively to take up and destroy combustible liquids which result from leakage or other occurrences as enumerated above. The present invention resides in the forming of blocks, bricks and other three-dimensional bodies, advantageously in the form of structural shapes from masonry construction, of expanded perlite or vermiculite by bonding these particles together with an inorganic refractory bindner, the blocks being highly absorptive and capable of rendering the absorbed liquid combustible along the surface and, possibly, within the interior of the body.

According to a specific feature of this invention, the body, after it has absorbed a quantity of oil or other combustible organic liquid, is ignited along an exposed surface to destroy the absorbed fuel and, advantageously, generate heat necessary for kindling other fuels. The surprising ability of three-dimensional bodies of such particles to retain the combustible liquids and render them inflammable at the surface of the body or therewithin appears to be a consequence of the nature of the body itself and of the inorganic binder holding it together. While applicant does not wish to be bound by any theory in connection with the surprising result described above, it appears that even liquids which are relatively nonflammable in a bulk state, can be absorbed effectively in a porous expanded perlite or vermiculite brick, block or drum and rendered inflammable simply by ignition along its surface. Apparently, the heat initially developed by combustion of finely divided films of the organic liquid along the surface of the body heats additional quantities of the liquid, driving them from the interstices of the body to the surface or volatilizing them in the interior of the body and forcing the gasified organic substance to the surface where it combusts with facility. The wicking characteristics of the body appear to both facilitate absorption and promote capillary attraction of the liquid to the surface along which ignition occurs.

The inorganic binder, described in greater detail below, should be refractory in the sense that the combustion temperature is incapable of breaking down the body and need be used only in relatively small quantities (e.g., 1–10% by volume), thereby interfering little if any with the absorbent qualities of the body. Even greater quantities of binder may be used, however, if desired. Upon ignition and consequent thermal destruction of the adsorbed liquid, the body is renewed for reuse with little diminution of absorptivity and capacity to promote combustion.

The combustion step may involve ignition of individual blocks or bodies for the stacking of a plurality of them with interstitial gaps facilitating access of air to the combustion surfaces; of particular suitability has been found the crosswise stacking of a log fire. As indicated earlier, the bodies may be of any desirable configuration but preferably are structural shapes which can be put together to form a catch basin, to line an oil-collecting trough or form an oil-collecting sump. In fact, brick-shaped bodies may be placed together contiguously to form a planar support or foundation for an oil burner or tank, or a cylindrical body may be used with or without an impermeable or perforated shell or envelope to form a receptacle for the combustible liquid. One or more such bodies may be disposed in the region of a spray or drip leak from a pump, tank or pipeline, or one or more such bodies may be merely placed in a bath of the liquid to absorb it therefrom. In a region or chamber spattered by oil or other combustible liquids, the bodies may be used as brickwork forming a masonry wall which can be taken down, subjected to combustion and renewal as indicated earlier and reused to construct the wall. The bodies may be used as foundation stones wherever oil may accumulate and are especially suited for use in the floors and walls of the oil-burner chambers of household-heating instalaltions.

When it is desired to make use of the coherent bodies impregnated with combustible liquid as igniting devices for household furnaces, charcoal grills or the like, the impregnated liquid is preferably heating oil, gasoline or alcohol into which the body is immersed. Upon such immersion, the impregnated body is placed in the furnace, the chimney stack or the like, and is covered with the fuel which is to be kindled. When the device is to be used for igniting charcoal stoves, I preferably saturate the body with alcohol (methanol or denatured alcohol) and place the body in the bottom of the grill, thereafter covering it with charcoal. After combustion of the liquid has terminated, the body remains in the hearth as a thermal insulation and bed for the coals. After extinguishing the fire, the body may be recovered for reuse in the manner previously described.

According to still another feature of this invention, the body may be used as a filter element to remove combustible organic liquids from water or inorganic fluids, the body being treated with a silicone or the like (see the copending application mentioned earlier) to render the oils specific and non-absorptive with respect to water. The bodies may be, according to still another feature of this invention, provided with reinforcement in the form of glass, asbestos or other mineral fiber and may be disposed in or permanently surrounded by a sheet metal envelope having an opening constituting a burner.

A plurality of openings may be provided in the housing to form burner apertures.

I have found that optimal results in the absorption capacity and the combustion of the body can be obtained when the expanded (blown) perlite or vermiculite has a particle size, prior to agglomeration with binder, up to 5 mm. but preferably not less than 0.01 mm. Best results are obtained with an average particle size of 1 to 3 mm. The bulk density of the body should be of not more than 150 kg./m.$^3$. The binder is preferably selected from monoaluminum phosphate, water glass and mixtures of phosphoric acid and clay.

The above and other objects, features and advantages of the present invention will become more readily apparent from the following description, reference being made to the accompanying drawing in which:

FIG. 1 is a perspective view diagrammatically illustrating a brick embodying the present invention;

FIG. 2 is a diagrammatic elevational view of the stacking of the particles in their agglomerated condition, representing the region II of FIG. 1;

FIG. 3 is a vertical section through another embodiment of this invention; and

FIG. 4 is a perspective view of still another device according to the present invention.

In FIG. 1, I show a brick which may be used as a foundation stone, wall lining or other structural element for an oil-collecting sump, an oil-spatter partition or support for an oil burner, which is capable of absorbing household-heating and other flowable combustible liquids such as gasoline and alcohol. The rectangular prism is, as is shown in FIG. 2, formed from particles 2 of expanded (blown) perlite or vermiculite having a particle size of 0.01 to 5 mm. and being held together by 1–10% by volume of an inorganic binder, e.g., monoaluminum phosphate or water glass applied in aqueous solution and dried, or equal parts by weight of concentrated phosphoric acid and clay, dried after application. The binder is represented at 3. A block 1 of this character has a bulk density up to 150 kg./m.$^3$ (preferably between 50 and 150 kg./m.$^3$) and an average particle size up to 5 mm. Glass or asbestos mineral fibers 5 may be embedded in the block as previously described. When the block 1 is used as a kindling body for a charcoal grill or the like, it is saturated with wood alcohol, placed in the heart of the grill, covered with charcoal and ignited. Suitable dimensions for the block are 3 cm. x 10 cm. x 10 cm. When the block is used as a foundation-wall member in the region of leaking or spattering oil, gasoline or the like, it is found that it can be removed and ignited either by stacking the blocks with spaces between them, or individually, without difficulty.

In FIG. 3, I show a body 6 of similar construction which is pot-shaped and has an upwardly open cavity 7 forming a collecting vessel for dripping oil or gasoline which is evidently absorbed into the interior of the body as represented by arrow 8. The body, except for the cavity 7, is lined with a sheet-metal shell 4. When the body is fully saturated with oil, a match can be placed in the concavity 7 to ignite the absorbed liquid and renew the device.

In FIG. 4, the absorptive medium is shown as a solid cylindrical block 9 which is retained in a cylindrical can 10 whose cover 11 is tight-fitted onto the can and is formed with an upstanding lip 12 surrounding an opening 13 forming a burner mouth. Here, too, the opening 13 forms a collecting vessel for oil drops or the like and sustains ignition without difficulty. It is found to be immaterial that the oil or gasoline may be mixed with water since the body may be treated with a silicone as described in the aforementioned copending application to resist absorption of water which will be retained in the cavities 7 or 13.

What is claimed is:

1. A combusion sustaining body, comprising a coherent porous mass of perlite or vermiculite particles bonded together with a binder selected from the group which consists of monoaluminum sulfate, water glass and mixtures of phosphoric acid and clay, the particles having a bulk density of up to 150 kg./m.$^3$ and a particle size up to about 5 mm.; and a hydrocarbon absorbed into the pores of said mass, said body having the configuration of a cylinder and said particles coated with a silicone hydrophobic material with at least one surface exposed to the atmosphere for sustaining combustion thereat.

2. The combustion-sustaining body defined in claim 1 wherein said surface is dished.

References Cited
UNITED STATES PATENTS

| | | | |
|---|---|---|---|
| 2,249,681 | 6/1941 | Briggs et al. | 252—449 X |
| 2,728,733 | 12/1955 | Hashimoto | 252—449 |
| 2,967,154 | 1/1961 | Beerman | 252—449 X |
| 3,089,760 | 5/1963 | Jaffe | 44—41 |
| 3,260,581 | 7/1966 | Martin | 44—41 |
| 3,351,444 | 11/1967 | Ryan et al. | 44—41 |

DANIEL E. WYMAN, Primary Examiner

C. F. DEES, Assistant Examiner

U.S. Cl. X.R.

44—41; 126—59.5; 252—449